(12) United States Patent
Aggarwal et al.

(10) Patent No.: US 12,199,829 B2
(45) Date of Patent: *Jan. 14, 2025

(54) NETWORK MANAGEMENT BASED ON ASSESSMENT OF TOPOLOGICAL ROBUSTNESS AND CRITICALITY OF ASSETS

(71) Applicant: Utopus Insights, Inc., Valhalla, NY (US)

(72) Inventors: Aanchal Aggarwal, White Plains, NY (US); Harsh Chaudhary, Ossining, NY (US); Yakup Koç, Delft (NL); Younghun Kim, White Plains, NY (US); Tarun Kumar, Mohegan Lake, NY (US); Abhishek Raman, Mahopac, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,443

(22) Filed: Jan. 10, 2023

(65) Prior Publication Data

US 2023/0155896 A1    May 18, 2023

Related U.S. Application Data

(63) Continuation of application No. 17/020,794, filed on Sep. 14, 2020, now Pat. No. 11,552,854, which is a
(Continued)

(51) Int. Cl.
*G06F 15/16* (2006.01)
*H04L 41/12* (2022.01)
(Continued)

(52) U.S. Cl.
CPC .......... *H04L 41/12* (2013.01); *H04L 41/145* (2013.01); *H04L 45/22* (2013.01);
(Continued)

(58) Field of Classification Search
CPC ....... H04L 41/12; H04L 41/145; H04L 45/22; H04L 43/0811; H04L 45/1283; Y04S 40/164; Y04S 40/168; Y04S 40/00
(Continued)

(56) References Cited

U.S. PATENT DOCUMENTS

| | | | | |
|---|---|---|---|---|
| 3,735,109 A | * | 5/1973 | Berthelemy | G06F 30/18 703/3 |
| 6,163,855 A | | 12/2000 | Shrivastava et al. | |

(Continued)

FOREIGN PATENT DOCUMENTS

WO    2012060883 A2    5/2012

OTHER PUBLICATIONS

Aanchal Aggarwal et al., "Failure Modeling by Incorporation of Terrestrial Conditions", U.S. Appl. No. 14/665,247, filed Mar. 23, 2015.
(Continued)

*Primary Examiner* — Imad Hussain
(74) *Attorney, Agent, or Firm* — Ahmann Kloke LLP

(57) ABSTRACT

A system and method of managing a network that includes assets are described. The method includes modeling the network as a directed graph with each of the assets represented as a node and determining alternative paths to each node from each available corresponding source of the node. The method also includes computing upstream robustness of each node, computing upstream robustness of the network, and computing downstream criticality of each node. Man-
(Continued)

aging the network and each asset of the network is based on the upstream robustness and the downstream criticality of each node.

19 Claims, 4 Drawing Sheets

Related U.S. Application Data continuation of application No. 16/000,818, filed on Jun. 5, 2018, now Pat. No. 10,778,529, which is a continuation of application No. 14/745,775, filed on Jun. 22, 2015, now Pat. No. 9,992,069, which is a continuation of application No. 14/665,398, filed on Mar. 23, 2015, now Pat. No. 9,923,778.

(51) Int. Cl.
*H04L 41/14* (2022.01)
*H04L 45/00* (2022.01)
*H04L 43/0811* (2022.01)
*H04L 45/128* (2022.01)

(52) U.S. Cl.
CPC ....... *H04L 43/0811* (2013.01); *H04L 45/1283* (2013.01); *Y04S 40/00* (2013.01)

(58) Field of Classification Search
USPC ...................................................... 709/223
See application file for complete search history.

(56) References Cited

U.S. PATENT DOCUMENTS

| | | | |
|---|---|---|---|
| 7,313,087 B2 | 12/2007 | Patil et al. | |
| 7,394,760 B1 | 7/2008 | Nucci et al. | |
| 7,453,824 B1 | 11/2008 | Nucci et al. | |
| 7,571,028 B2 | 8/2009 | Apinski et al. | |
| 7,991,512 B2 | 8/2011 | Chandra et al. | |
| 8,862,743 B1 | 10/2014 | Petrescu-Prahova et al. | |
| 8,935,129 B1* | 1/2015 | Gao | G06T 17/005 345/619 |
| 9,094,856 B1 | 7/2015 | Tian et al. | |
| 10,778,529 B2 | 9/2020 | Aggarwal et al. | |
| 11,153,228 B1* | 10/2021 | Hosamani | H04L 41/0806 |
| 2008/0183659 A1 | 7/2008 | Kuttan et al. | |
| 2008/0259815 A1* | 10/2008 | Gorman | H04L 41/22 370/254 |
| 2009/0094076 A1 | 4/2009 | Reddy | |
| 2009/0097418 A1* | 4/2009 | Castillo | H04L 41/147 370/255 |
| 2010/0322244 A1 | 12/2010 | Dasylva et al. | |
| 2012/0029897 A1 | 2/2012 | Cherian et al. | |
| 2012/0213124 A1 | 8/2012 | Vasseur et al. | |
| 2012/0230204 A1 | 9/2012 | Vasseur et al. | |
| 2012/0310435 A1 | 12/2012 | Taft | |
| 2013/0016612 A1 | 1/2013 | Vasseur et al. | |
| 2013/0028073 A1* | 1/2013 | Tatipamula | H04L 45/037 370/218 |
| 2013/0064070 A1 | 3/2013 | Kolavennu | |
| 2013/0097125 A1 | 4/2013 | Marvasti et al. | |
| 2013/0121331 A1 | 5/2013 | Vasseur et al. | |
| 2013/0163407 A1* | 6/2013 | Sinha | H04L 45/302 370/217 |
| 2013/0223218 A1 | 8/2013 | Vasseur et al. | |
| 2014/0129746 A1 | 5/2014 | Zhou et al. | |
| 2014/0280921 A1 | 9/2014 | Vanderkoy et al. | |
| 2015/0120359 A1 | 4/2015 | Dongieux | |
| 2015/0195184 A1* | 7/2015 | Vasseur | H04W 24/02 706/12 |
| 2015/0199475 A1 | 7/2015 | Kural et al. | |
| 2015/0236930 A1 | 8/2015 | Gorman et al. | |
| 2016/0125068 A1 | 5/2016 | Dongieux | |
| 2016/0191241 A1 | 6/2016 | Allen et al. | |
| 2016/0283850 A1 | 9/2016 | Aggarwal et al. | |
| 2016/0285675 A1 | 9/2016 | Aggarwal et al. | |
| 2016/0285691 A1 | 9/2016 | Aggarwal et al. | |
| 2017/0149616 A1* | 5/2017 | Haines | H04L 41/12 |

OTHER PUBLICATIONS

Aanchal Aggarwal et al., "Failure Modeling by Incorporation of Terrestrial Conditions", U.S. Appl. No. 14/745,688, filed Jun. 22, 2015.

Aanchal Aggarwal et al., "Network Management Based on Assessment of Topological Robustness and Criticality of Assets", U.S. Appl. No. 14/665,398, filed Mar. 23, 2015.

Aanchal Aggarwal et al., "Network Management Based on Modeling of Cascading Effect of Failure", U.S. Appl. No. 14/665,316, filed Mar. 23, 2015.

Aanchal Aggarwal et al., "Network Management Based on Modeling of Cascading Effect of Failure", U.S. Appl. No. 14/745,727, filed Jun. 22, 2015.

Bompard, E. et al., "Extended Topological Approach for the Assessment of Structural Vulnerability in Transmission Networks," IET Generation, Transmission & Distribution, Jun. 2010.

Hamoud, G. et al., "Assessment of Component Criticality in Customer Delivery Systems," 8th International Conference on Probabilistic Methods Applied to Power Systems, Sep. 12-16, 2004.

Kim, Yusoon, et al. "Supply network disruption and resilience: A network structural perspective." Oct. 27, 2014. Elsevier. pp. 1-17 (Year: 2014).

Koc, Y. et al., "The Impact of the Topology on Cascading Failures in a Power Grid Model," Physica A: Statistical Mechanics and its Applications, May 15, 2014.

List of IBM Patents or Patent Applications Treated as Related; (Appendix P), Filed Jul. 9, 2015; 2 pages.

Mao, A. et al., "Electric Power Grid Structural Vulnerability Assessment," IEEE Power Engineering Society General Meeting, Jun. 18, 2006.

Scardoni et al. "Node Interference and Robustness". Feb. 20, 2014. pp. 1-10.

Schwan, M. et al., "Reliability Centered Asset Management in Distribution Networks—Process and Application Examples," 19th International Conference on Electricity Distribution, May 21-24, 2007.

Sterbenz, J. et al., "Evaluation of Network Resilience, Survivability, and Disruption Tolerance: Analysis, Topology Generation, Simulation, and Experimentation," Telecommunications Systems, Feb. 2013.

\* cited by examiner

NETWORK MANAGEMENT BASED ON ASSESSMENT OF TOPOLOGICAL ROBUSTNESS AND CRITICALITY OF ASSETS

CROSS-REFERENCE TO RELATED APPLICATIONS

The present application is a continuation of U.S. application Ser. No. 17/020,794, filed Sep. 14, 2020 and entitled "Network Management Based on Assessment of Topological Robustness and Criticality of Assets," now U.S. Pat. No. 11,552,854, which is a continuation of U.S. application Ser. No. 16/000,818, filed Jun. 5, 2018 and entitled "Network Management Based on Assessment of Topological Robustness and Criticality of Assets," now U.S. Pat. No. 10,778,529, which is a continuation of U.S. patent application Ser. No. 14/745,775, filed Jun. 22, 2015 and entitled "Network Management Based on Assessment of Topological Robustness and Criticality of Assets," now U.S. Pat. No. 9,992,069, which is a continuation of U.S. patent application Ser. No. 14/665,398 filed Mar. 23, 2015 and entitled "Network Management Based on Assessment of Topological Robustness and Criticality of Assets," now U.S. Pat. No. 9,923,778, which are hereby incorporated by reference herein.

BACKGROUND

The present invention relates to network management, and more specifically, to network management based on assessment of the topological robustness and criticality of assets.

There are many types of networks that include a number of assets that affect each other. Exemplary networks with a number of interdependent assets include a power network (power grid), gas network, and a water network. Reliability of such networks can depend not only on the assets themselves and their failure rates but also on the robustness of the network topology. Assets of a given network can be of different types and can be for different uses. For example, a power network includes electrical assets (e.g., transformers, switches, fuses) and non-electrical assets (e.g., support structures, poles).

SUMMARY

According to one embodiment of the present invention, a method of managing a network that includes assets includes modeling, using a processor, the network as a directed graph with each of the assets represented as a node; determining, using the processor, alternative paths to each node from each available corresponding source of the node; computing upstream robustness of each node; computing upstream robustness of the network: computing downstream criticality of each node; and managing the network and each asset of the network based on the upstream robustness and the downstream criticality of each node.

According to another embodiment, a network management system to manage assets of the network includes a memory device configured to store instructions, and a processor configured to process the instructions to compute upstream robustness of each node, compute upstream robustness of the network, compute downstream criticality of each node, and to manage the network based on the upstream robustness and the downstream criticality of each node.

According to yet another embodiment, a computer program product includes a tangible storage medium readable by a processing circuit and storing instructions for execution by the processing circuit to perform a method of managing a network that includes assets. The method includes modeling the network as a directed graph with each of the assets represented as a node; determining alternative paths to each node from each available corresponding source of the node; computing upstream robustness of each node; computing upstream robustness of the network; computing downstream criticality of each node; and managing the network and each asset of the network based on the upstream robustness and the downstream criticality of each node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, topological robustness can affect network reliability in addition to failure rate of assets within the network. Topological robustness of the network refers to whether multiple sources are available to a given asset such that, if one fails, the other(s) can continue to supply the asset, for example. A lack of robustness increases criticality of an asset. That is, for example, the only asset supplying several downstream assets is more critical than one of several assets supplying a downstream asset. The interplay between robustness and criticality, therefore, effects the management of the network. A less robust and more critical asset may require more frequent inspection, for example. Embodiments of the methods and systems described herein relate to determining upstream robustness as well as downstream criticality in order to manage the network and its assets. While an electrical network (grid) is discussed for exemplary purposes, the description herein applies to any network with interdependent assets.

Figure 1:
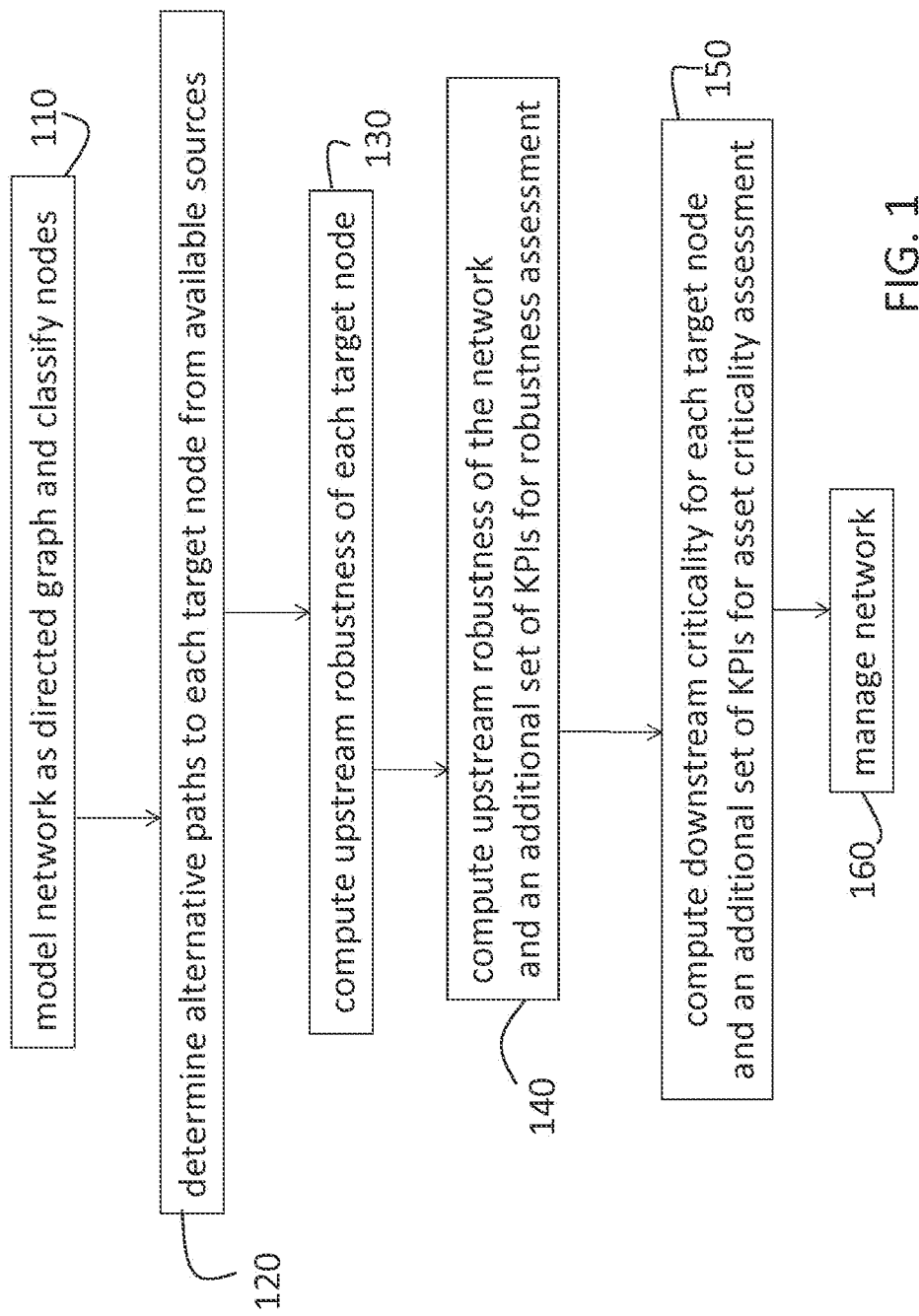
FIG. 1 is a process flow of a method of managing a network based on determining upstream robustness and downstream criticality according to embodiments.

FIG. 1 is a process flow of a method of managing a network based on determining upstream robustness and downstream criticality according to embodiments detailed below. Throughout the discussion herein, asset and node are used interchangeably because the representation of the assets in a directed graph is as nodes. At block 110, modeling the network as a directed graph includes indicating the assets of the network as nodes and showing the interconnection among the nodes as edges or paths which are further detailed below. Determining alternative paths to each target node from available sources, at block 120, leads to computing the upstream robustness of each target node at block 130. At block 140, upstream robustness of the network is computed. At block 140, an additional set of key performance indicators (KPIs) used for robustness assessment are also computed. At block 150, computing downstream criticality for each target node is performed along with computing an additional set of KPIs for assessment of asset criticality. Managing the network at block 160 involves examining the robustness and criticality determined at the previous processes. Each of these processes is further detailed below.

Figure 2:
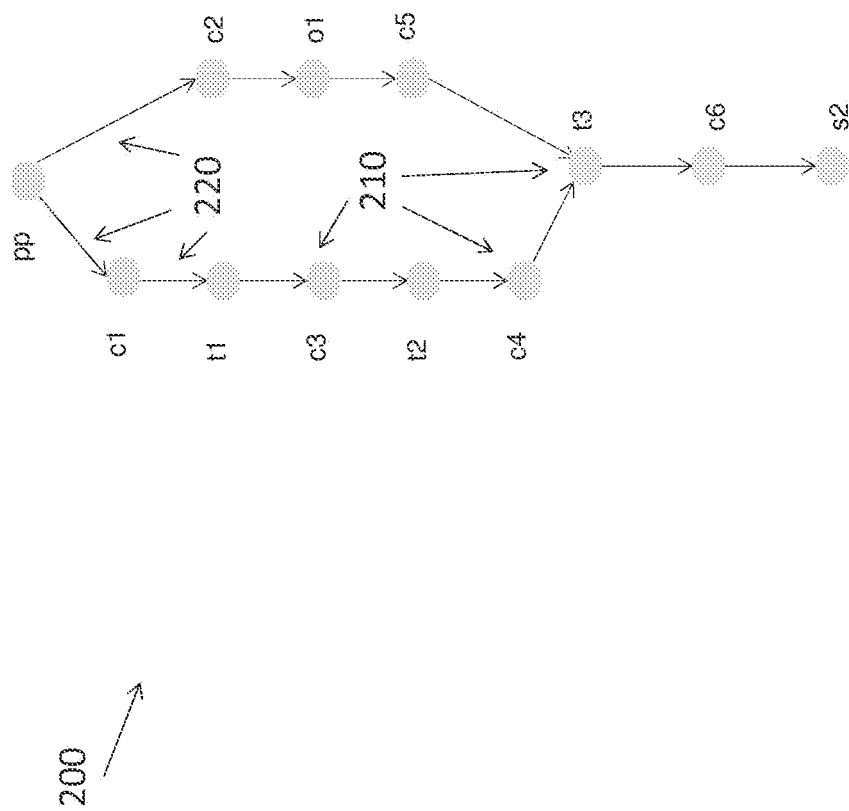
FIG. 2 is an exemplary graph used to identify nodes and connections for embodiments of the invention.

FIG. 2 is an exemplary graph 200 used to identify nodes 210 and connections 220 for embodiments of the invention. Several nodes 210 are shown with connections 220 indicating the physical topology of the network. Steps involved in the generation of the graph 200 are known and are not detailed here. Generally, the physical topology is converted into a list of edges. Each edge is an ordered pair of two assets, and it is assumed that electric power flows between the pair of assets. The assets are represented by the nodes 210 and the connectivity 220 is defined by the edges. The nodes 210 may be classified in one of three categories: source assets that serve as the source of all electrical power in the grid, auxiliary assets (e.g., cables, poles, switches, protection devices) that are critical to delivery of electrical power to sink assets, and the sink assets that directly serve customers. In the exemplary graph 200, the nodes 210 include a source asset—source pp—a sink asset—endpoint s2—and auxiliary assets—cables c1-c6, transformers t1-t3, and open point o1. While the exemplary graph 200 pertains to a power network (grid), the embodiments detailed herein are not limited to a power network, as noted above.

Determining the set of alternate paths (at block 120) Pt from the source nodes to each of the target nodes t includes using a breadth-first search (BFS). The BFS involves traversing the graph (e.g., 200 in FIG. 2) by beginning with the source node (e.g., pp in FIG. 2) and progressing through the nodes (210, FIG. 2) one-at-a-time from the root to its neighbors. The set Pt is given by:

$$P_t = \{P_{t,1}, P_{t,2}, \ldots, P_{t,m}\} \qquad [EQ. 1]$$

The number of paths to the target node t is m. For the $i^{th}$ path in the set Pt, which represents a length of l(l number of assets) from the source asset to the target node t, $$P_{t,i} = \{a_1, a_2, \ldots a_l\} \qquad [EQ. 2]$$

Each element in the Pt set represents a path Pt,i, and each path Pt,i includes a set of intervening assets.

Figure 3:
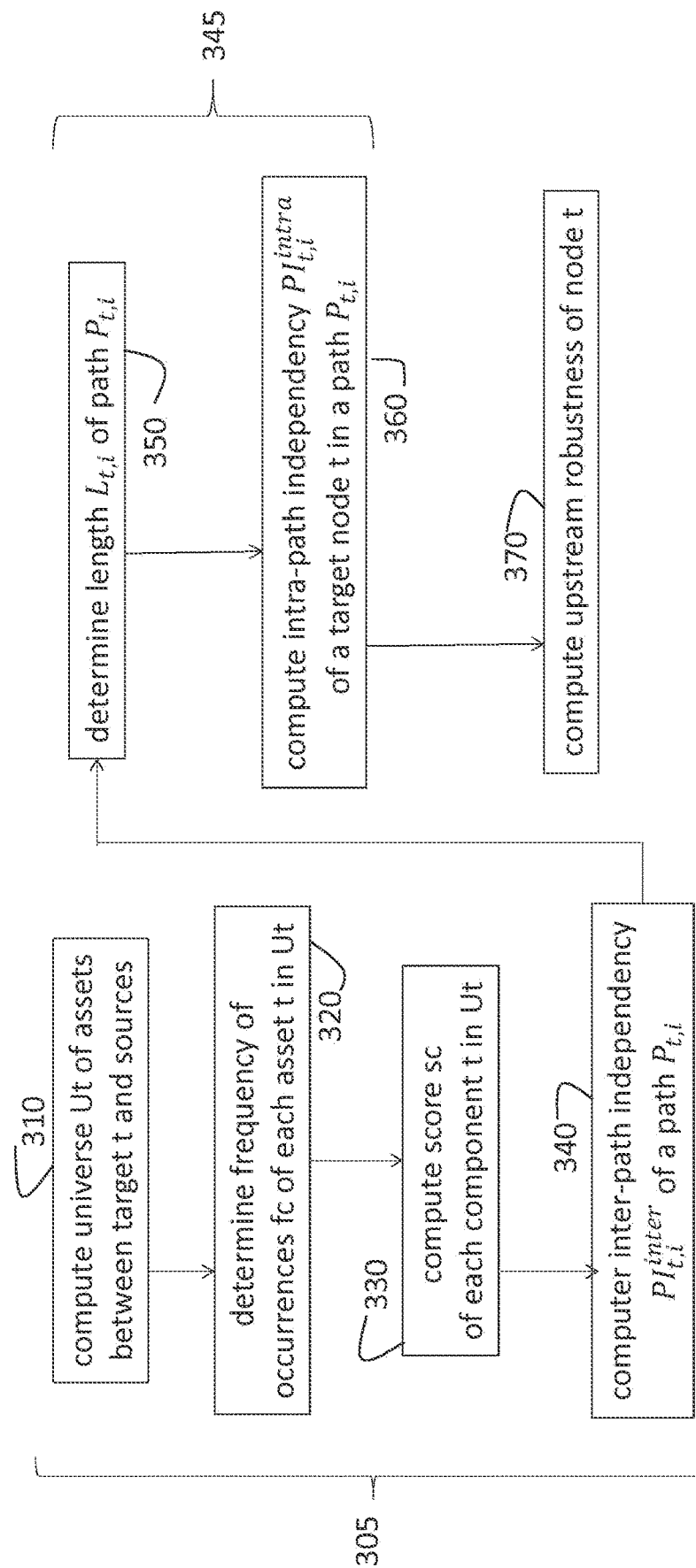
FIG. 3 shows the processes involved in computing upstream robustness at block 130 (FIG. 1) according to an embodiment.

FIG. 3 shows the processes involved in computing upstream robustness at block 130 (FIG. 1) according to an embodiment. Generally, the processes include computing inter-path independency of each alternative path Pt,i in Pt 305, computing intra-path independency of the target node t in each alternative path Pt,i in Pt 345, and computing the upstream robustness for each target node t based on the inter-path independency and the intra-path independency 370. Each of these processes if further detailed herein. At block 310, computing the universe Ut of assets between the target node t and the sources is as follow:

$$U_t = \{P_{t,1} \cup P_{t,2} \cup \ldots \cup P_{t,m}\} \qquad [EQ. 3]$$

Ut is the union of the paths in the set Pt. Determining frequency of occurrences fc of each asset t in Ut, at block 320, is given by:

$$f_c = \left\{ \begin{array}{l} f_c + 1, \, ifc \in P_{t,i} \\ f_c, \, ifc \notin P_{t,i} \end{array} \right\} \qquad [EQ. 4]$$

Computing the score sc of each component t in Ut is based on the score being an inverse of the frequency:

$$S_c = \frac{1}{f_c} \qquad [EQ. 5]$$

Then, at block 340, computing the inter-path independency of a path Pt,i is based on summing the score of each component in the path and normalizing with the length of the path Lt,i:

$$PI_{t,i}^{inter} = \frac{1}{L_{t,i}} \sum_{i \in P_{t,i}} S_i \qquad [EQ. 6]$$

At block 350, determining the length of the path Pt,i in terms of the number of components in the path is based on the cardinality (number of elements) of the path (set) Pt,i and is given by:

$$L_{t,i} = |P_{t,i}| \qquad [EQ. 7]$$

Then, at block 360, computing the intra-path independency of a target node t in a path $P_{t,i}$ is as a function of the length of the path determined from EQ. 7.

$$PI_{t,i}^{intra} = \frac{1}{L_{t,i} + 1} \qquad [EQ. 8]$$

The "+1" in the denominator is included to include the target node t, because the target node t may fail, as well. Once the inter-path independency (at block 340, based on blocks 310-340) and the intra-path independency (at block 360, based on blocks 350 and 360) are computed, upstream robustness of the target node t is computed, at block 370, as:

$$R_{ups}^t = \sum_{i=1}^{m} PI_{t,i}^{inter} PI_{t,i}^{intra} \qquad [EQ. 9]$$

The number of alternative paths to the target node t is m. As EQ. 9 indicates, the upstream robustness is a function of the level of disjointedness between all alternative paths to the target node t (represented by the inter-path independency) and the number of components on which the target node t depends to reach a source in each of these paths (represented by intra-path independency). That is, the more disjointed the alternative paths are (such that a failure in one is less likely to affect another) and the fewer components between the target node t and each source of each path (such that there are fewer chances of the path to the source being disrupted), the more robust the target node t is.

At block 140 (FIG. 1), computing upstream robustness of the network G is based on the upstream vulnerability of individual assets of the network G. For the network G with N assets (N target nodes in turn), the network upstream robustness is given by:

$$R_{ups}^G = \sum_{i=1}^{N} R_{ups}^i \quad \text{[EQ. 10]}$$

The network upstream robustness measures the aptitude of the network to continue operation (e.g., deliver electric power to nodes of the network in the exemplary case of an electrical grid application). Thus, only the robustness of each asset is considered in computing the network robustness. Additional KPIs are also computed at block 140. The path count (PCt) of a target node t assesses the topological redundancy in reaching the target node t from available sources. The path count evaluates the total number of alternative paths to the target node t from the source(s) and is computed as the cardinality of Pt (determined in EQ. 1) as:

$$PC_t = |P_t| \quad \text{[EQ. 11]}$$

The effective disjoint path count (EDPCt) of a target node t quantifies the effective number of independent paths from a source to the target node t. The EDPCt accounts for the disjointedness of each path Pt,i (from EQ. 2) in the set of paths Pt and is computed as a summation of the inter-path independency of each path from a source to the target node t:

$$EDPC_t = \sum_{i=1}^{m} PI_{t,i}^{inter} \quad \text{[EQ. 12]}$$

The effective path length (EPLt) of a target node t gives the average effective distance to sources of the target node t in terms of the number of intervening assets. The EPLt is computed as a number of assets per effective disjoint path between the target node t and its sources:

$$EPL_t = \frac{|U_t|}{EPDC_t} \quad \text{[EQ. 13]}$$

At block 150 (FIG. 1), downstream criticality is computed for each target node t. Because, with respect to activity downstream of a given asset, the asset is not a target (as it is for an upstream source), the term component c is used rather than target node t. To determine the downstream criticality of a component c of a network G, the component c is removed from the network to obtain a reduced network G':

$$G' = G \backslash c \quad \text{[EQ. 14]}$$

The network upstream robustness is computed for G', the reduced network, based on the processing detailed above at blocks 110 through 140. Then, the downstream criticality of the component c is computed as a drop in the network upstream robustness of the network G (see EQ. 10):

$$C_{down}^c = \frac{(R_{ups}^G - R_{ups}^c) - R_{ups}^{G'}}{(R_{ups}^G - R_{ups}^c)} * 100 \quad \text{[EQ. 15]}$$

The use of the robustness of the component c in both the numerator and denominator acts as a correction factor to ensure that the downstream criticality of a leaf node is 0. A leaf node is one with no children such that it has no effect on assets downstream of itself. Additional KPIs are also computed at block 150. The disconnection impact index (DIIt) of an asset t quantifies the impact of its removal from the network from different perspectives. Consequences of the removal of an asset t can be measured based on different aspects (consequences of the removal) including, for example, the number of disconnected assets, the number of disconnected customers (from the network), the amount of lost demand, and the amount of lost revenue. Consequences represent the set of these and other consequences, and $$S_t = \{a_1, a_2, \ldots, a_l\} \quad \text{[EQ. 16]}$$

EQ. 16 indicates the set of assets that are disconnected upon removal of the asset t. Then DIIt is given by:

$$DII_t = \sum_{t \in s_t} consequences_t \quad \text{[EQ. 17]}$$

With regard to the consequences, for example, quantifying DIIt of an asset t in terms of the number of disconnected customers requires evaluating the summation of the number of disconnected customers per disconnected asset in the set of assets shown in EQ. 16.

Determining the upstream robustness and downstream criticality of the assets of the network, as well as the network as a whole facilitates managing the network at block 160. The relative criticality of a given asset may suggest a more or less frequent inspection and maintenance period, for example. More critical assets may be inspected and maintained more often than less critical assets. As another example, the source of a less robust asset may be maintained more often than the source of a more robust asset. The information may be used to upgrade the system, as well. For example, a redundant source may be added for highly critical assets.

Figure 4:
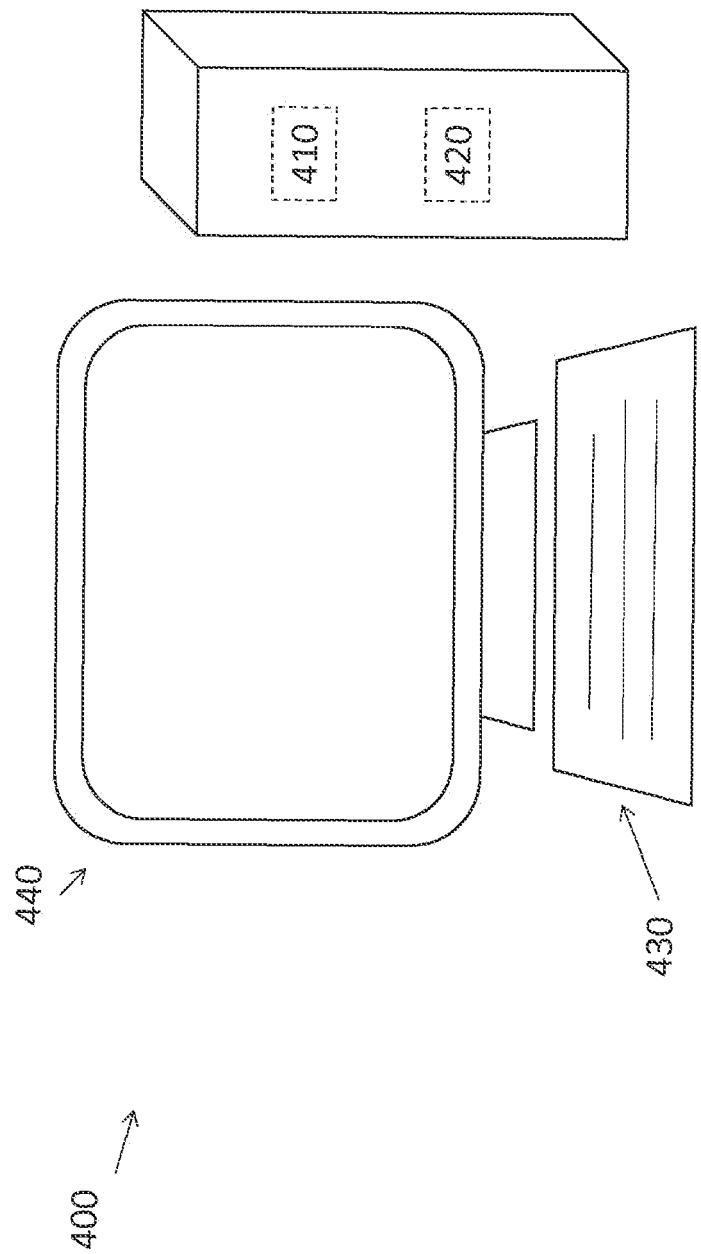
FIG. 4 is a block diagram of a processing system to implement embodiments of the invention.

FIG. 4 is a processing system 400 configured to implement embodiments described herein. The processes detailed herein may be implemented by one or more processors (processing circuits) 410 based on instructions stored in one or more memory devices 420. The memory devices 420 may additionally store data used in the processing. The instructions and one or more memory devices 420 represent a computer program product to implement the detailed processes. The processing system 400 may additionally include an input interface 430 (e.g., keyboard, wired or wireless communication link) to receive commands or data, as well as an output interface 440 (e.g., display device, communication link) to send output. The computer program product (420) and processor 410 may be stand-alone components or may be integrated with other components of the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory storage medium readable by a processing circuit and storing instructions for executing by the processing circuit to perform a method of managing a network that includes assets, the network being previously modeled as a directed graph, the method comprising:
   determining paths of the network between each of a set of nodes of the network, each of the assets representing one of the set of nodes;
   computing upstream robustness of each of the set of nodes;
   computing downstream criticality of each of the set of nodes; and
   managing the network and at least a subset of the assets of the network based on the upstream robustness of each of the set of nodes and the downstream criticality of each of the set of nodes.

2. The non-transitory storage medium of claim 1, the method further comprising:
   classifying each node in a directed graph, wherein the classifying each of the set of nodes includes classifying each of the set of nodes as a source asset, a target asset that directly services a customer of the network, or an auxiliary asset that delivers a resource of the network from or to at least one target asset.

3. The non-transitory storage medium of claim 1, wherein the computing the upstream robustness of each of the set of nodes includes computing inter-path independency and intra-path independency for each of the set of nodes.

4. The non-transitory storage medium of claim 1, the method further comprising assessing topological redundancy of each of the set of nodes based on determining a total number of alternative paths to the node from sources of the node.

5. The non-transitory storage medium of claim 1, the method further comprising determining an effected disjointed path count of each of the set of nodes based on an inter-path independency of each path from sources of the node to the node.

6. The non-transitory storage medium of claim 1, the method further comprising determining an average effective distance from sources of each node to the node in terms of a number of intervening assets.

7. The non-transitory storage medium of claim 1, wherein the computing downstream criticality of each of the set of nodes includes removing a particular node from the network to generate a reduced network and determining upstream robustness of the reduced network and determining an impact of the removing the particular node based on a number of disconnected customers in the reduced network.

8. The non-transitory storage medium of claim 1, wherein managing the network based on the upstream robustness and the downstream criticality of each of the set of nodes includes increasing maintenance frequency of a first node with a lower upstream robustness than a second node and increasing maintenance frequency of a third node with a higher downstream criticality than a fourth node.

9. The non-transitory storage medium of claim 1, wherein the network is an electric power network, and an edge between a pair of the nodes represents a flow of electric power between a pair of the assets corresponding to the pair of the nodes.

10. The non-transitory storage medium of claim 1, wherein the network is a gas network.

11. The non-transitory storage medium of claim 1, wherein the network is a water network.

12. The non-transitory storage medium of claim 1, wherein the upstream robustness of each of the set of nodes is computed in accordance with alternative paths.

13. The non-transitory storage medium of claim 1, wherein the upstream robustness of the each of the set of nodes is directly proportional to a disjointedness of alternative paths.

14. The non-transitory storage medium of claim 1, wherein the upstream robustness of the each of the set of nodes is inversely proportional to a number of nodes between the each node and each source node of each of alternative paths.

15. A computer program product comprising:
   a tangible non-transitory storage medium readable by a processing circuit and storing instructions for execution by the processing circuit to perform a method of managing a network that includes assets, the network being previously modeled as a directed graph the method comprising:
   determining paths of the network between each of a set of nodes of the network, each of the assets representing one of the set of nodes;
   computing upstream robustness of each of the set of nodes;
   computing downstream criticality of each of the set of nodes; and
   managing the network and at least a subset of the assets of the network based on the upstream robustness and the downstream criticality of each node.

16. The computer program product according to claim 15, further comprising classifying each node in a directed graph, where in the classifying each of the set of nodes includes classifying each node as a source asset, a target asset that directly serves a customer of the network, or an auxiliary asset that delivers a resource of the network from to at least one target asset.

17. The computer program product according to claim 15, wherein the computing the upstream robustness of each of the set of nodes includes computing inter-path independency and intra-path independency for each node.

18. The computer program product according to claim 15, wherein the computing the upstream robustness of the network is based on the upstream robustness of each of the nodes.

19. The computer program product according to claim 15, further comprising determining an effected disjoint path count of each node based on an inter-path independency of each path from sources of the node to the node.

\* \* \* \* \*